United States Patent [19]

Roberts et al.

[11] Patent Number: 5,249,909
[45] Date of Patent: Oct. 5, 1993

[54] TOWING AND WRECKER TRUCK

[76] Inventors: Don Roberts, 720 Pine St., Auburndale, Fla. 33823; Steve Gerstner, 159 Bahia Ct., Winter Haven, Fla. 33880

[21] Appl. No.: 820,495

[22] Filed: Jan. 14, 1992

Related U.S. Application Data

[63] Continuation of Ser. No. 539,547, Jun. 18, 1990, abandoned.

[51] Int. Cl.⁵ .............................................. B60P 1/04
[52] U.S. Cl. ................................. 414/476; 280/43.18; 280/43.23; 414/477; 414/480; 414/563
[58] Field of Search ...................... 414/474–480, 414/484, 485, 522, 563; 280/43.18, 43.23, 402, 704

[56] References Cited

U.S. PATENT DOCUMENTS

| | | | |
|---|---|---|---|
| 2,576,385 | 11/1951 | Bigsby | 414/522 X |
| 2,621,814 | 12/1952 | Lisota | 414/477 |
| 2,774,606 | 12/1956 | Burweger et al. | 280/43.23 X |
| 2,932,418 | 4/1960 | Ripley | 414/478 |
| 2,940,768 | 6/1960 | Thompson et al. | 280/43.18 |
| 3,450,282 | 6/1969 | Ezolt | 414/477 |
| 4,239,275 | 12/1980 | Horneys et al. | 414/478 |
| 4,318,657 | 3/1982 | Znidaric | 414/478 |
| 4,493,491 | 1/1985 | Karlik | 280/43.23 |
| 4,702,662 | 10/1987 | Marlett | 414/477 |
| 4,737,066 | 4/1988 | Allison, Jr. | 414/563 |
| 4,750,856 | 6/1988 | Lapiolahti | 414/477 X |
| 4,756,658 | 7/1988 | Moore et al. | 414/477 |
| 4,795,303 | 1/1989 | Bubik | 414/478 |
| 4,842,470 | 6/1989 | Hubbard | 414/478 |
| 4,859,134 | 8/1989 | Lock | 414/563 |
| 4,929,142 | 5/1990 | Nespor | 414/477 X |
| 4,948,327 | 8/1990 | Crupi, Jr. | 280/402 X |
| 4,968,052 | 11/1990 | Alm et al. | 414/563 |
| 5,011,362 | 4/1991 | Pijanowski | 414/480 |

Primary Examiner—David A. Bucci

[57] ABSTRACT

A towing truck incorporating both an elevated deck and a stinger for towing and hauling vehicles. Both are hydraulically operated with the deck sliding along a pair of oppositely spaced rails which are pivotally secured to the framework of the truck. A locking assembly is disclosed which engages the deck's substructure, thereby restraining the deck in place.

15 Claims, 3 Drawing Sheets

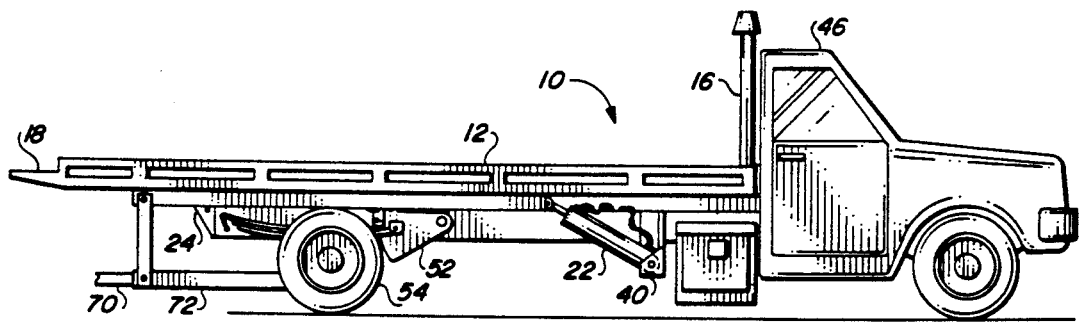
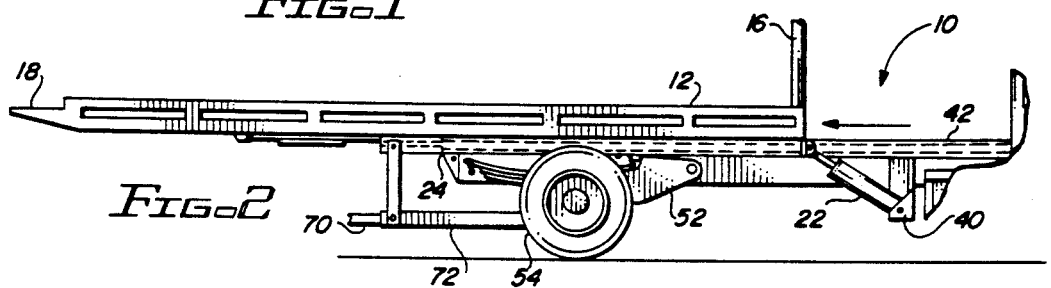
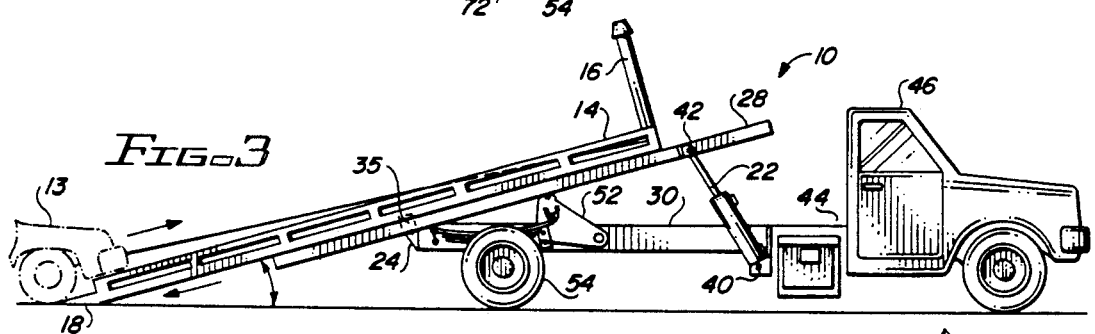
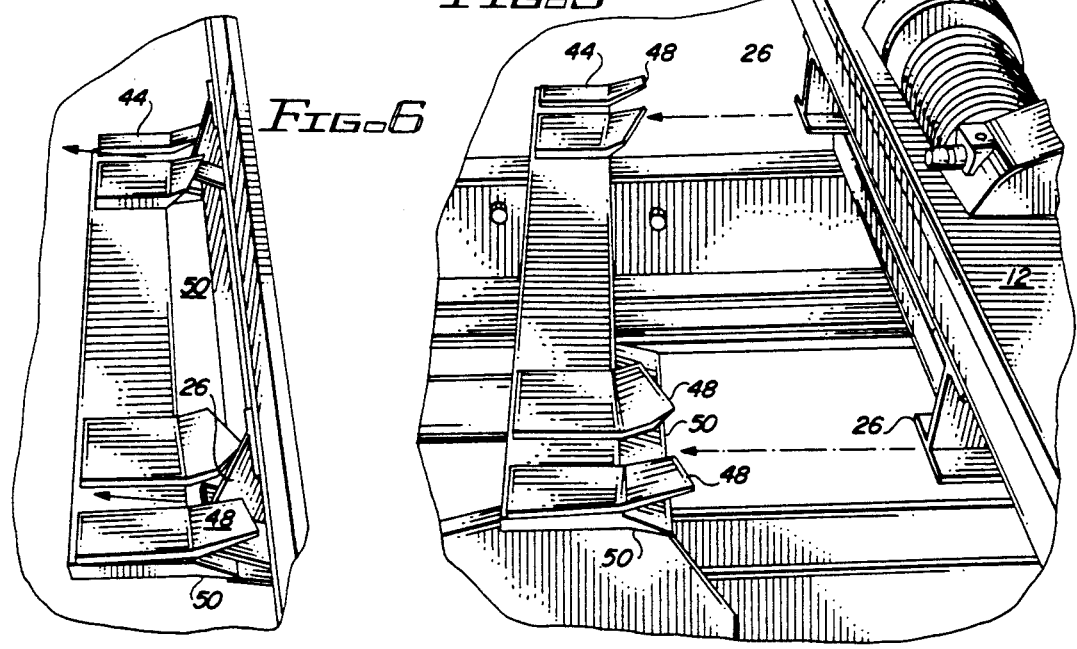

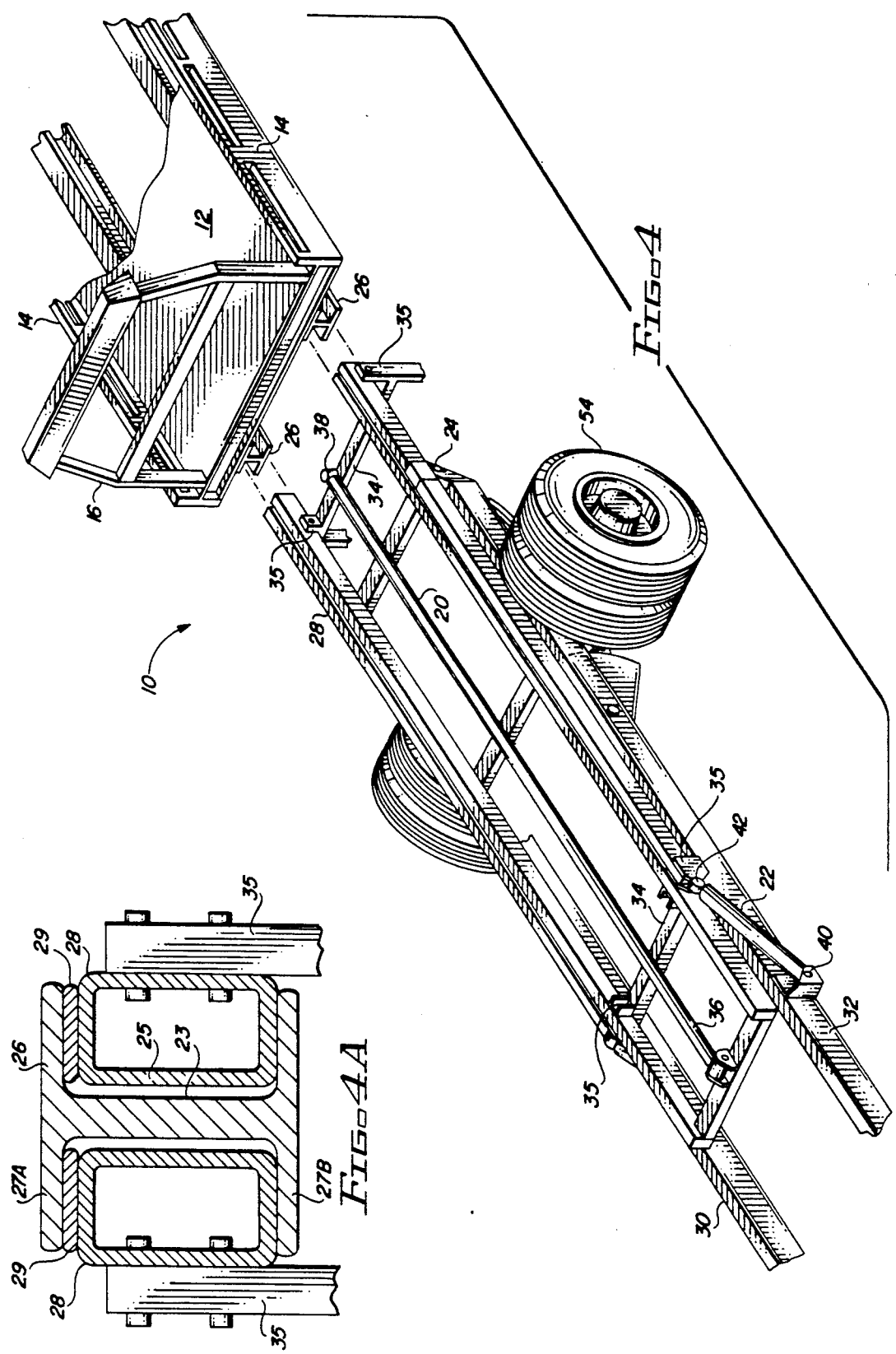

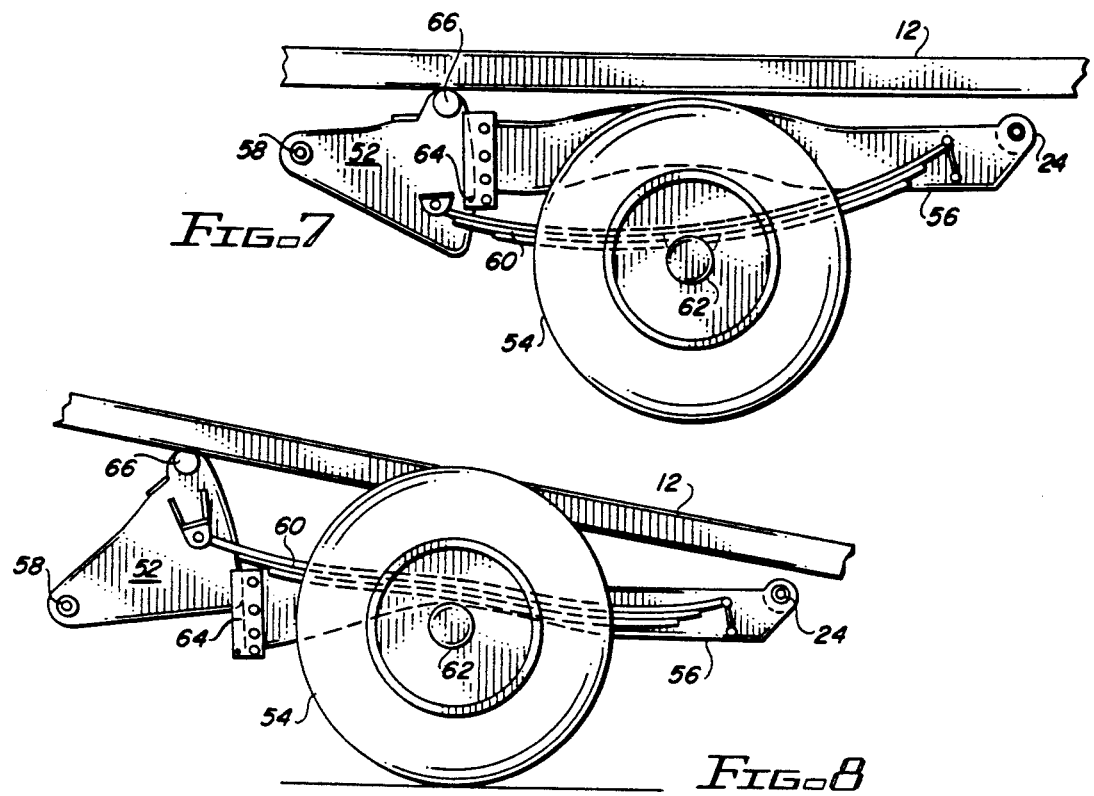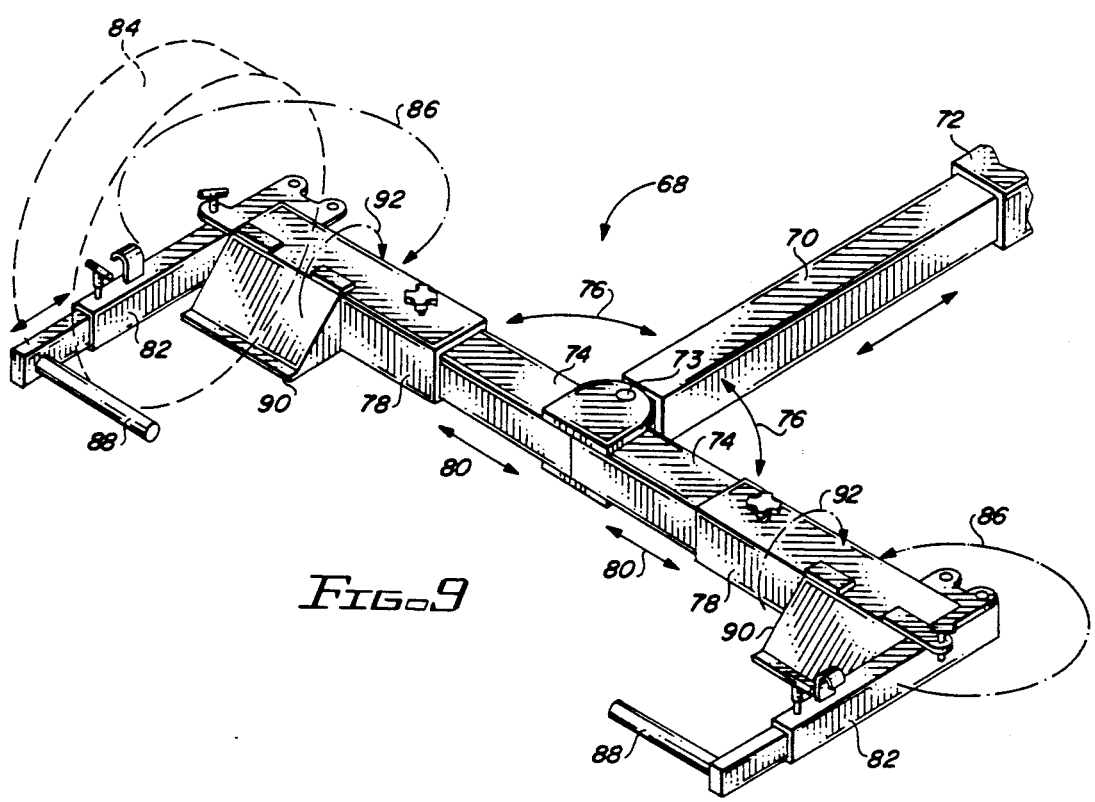

TOWING AND WRECKER TRUCK

This is a continuation of application Ser. No. 07/539,547 filed Jun. 18, 1990, now abandoned.

BACKGROUND OF THE INVENTION

1. Field of the Invention

This invention pertains to towing trucks in general and, more particularly, to a towing truck that is capable of towing two (2) vehicles at the same time, if necessary.

2. General Background

There are at least three (3) methods used to tow vehicles. The first utilizes a small boom from which a cable is attached to the to-be-towed vehicle. The second incorporates a rigid stinger that lifts the to-be-towed vehicle via its wheels or bumper. The third literally pulls the to-be-towed vehicle up a ramp and onto an elevated deck. This invention pertains to the latter two methods of towing vehicles.

The advantage of the stinger method of towing vehicles is that it is relatively easy to accomplish. Preferably the front tires of the to-be-towed vehicle are lifted above the pavement before being towed away much like the boom and cable arrangement. A drawback to this method is when the to-be-towed vehicle is wrecked in such a manner that its frame is bent or both tires on the same side are damaged; then, the towed vehicle will not tow properly and instead will "fishtail" behind the tow truck, thereby creating a traffic hazard.

An advantage to the elevated deck method of towing is that no matter what shape the car is in, it can always be pulled onto the deck and transported elsewhere. A disadvantage to this method is that once the vehicle is loaded, care must be taken to prevent it from shifting laterally as this puts an undue burden on the sub-frame of the elevated deck. Also, as can be surmised, the smaller or less steep the ramp incline, the less force that is needed to pull the vehicle up the ramp and onto the deck. Further, vehicles with low ground clearance require a low-angle ramp to avoid damage in being pulled up a ramp.

It is thus an object of this invention to provide a towing truck that incorporates the advantages of both the stinger method and the elevated deck method of towing. It is also an object of this invention to provide a towing vehicle having an elevated deck that is operated to achieve a low-incline ramp angle. Another object of this invention is to provide a stronger rail arrangement upon which the deck slides in order to withstand larger lateral forces. Still another object of this invention is to provide a locking/alignment mechanism for the deck that securely retains it in the horizontal towing position. These and other objects of this invention will become obvious upon further investigation.

SUMMARY OF THE PRESENT INVENTION

The preferred embodiment of the apparatus of the present invention provides a towing truck having both an elevated deck and an extendable stinger each configured to secure a vehicle thereto. The elevated deck is pivotally supported upon a sub-frame with the deck being slidable along oppositely spaced rails. Means are provided for both tilting the deck vertically about a hinge and for horizontally extending the deck behind the back of the truck along the rails. When the deck is in the untilted, retracted position, a locking assembly secures the deck in place to prevent any possible mishap, due to accidental bed-tilting or the like, during vehicle transportation.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a side view of the wrecker truck of the present invention, minus the stinger, with all components in the normal position;

FIG. 2 is a side view, partially cut away of the wrecker truck of the present invention with the deck slid backward;

FIG. 3 is a side view, partially cut away of the wrecker truck of the present invention with the deck pivoted;

FIG. 4 is a top perspective view, partially broken away, illustrating the construction of the wrecker truck of the present invention;

FIG. 4A is a cross-sectional view of a portion of the apparatus shown in FIG. 4;

FIG. 5 is a pictorial view, partially broken away, illustrating the dual flange locks;

FIG. 6 is a pictorial view, partially broken away, of the dual flange locks with the I-beam engaging the locks;

FIG. 7 is a pictorial view, partially broken away, of the spring lowering plate in the down or normal position;

FIG. 8 is a pictorial view, partially broken away, of the spring lowering plate in the up or raised position; and, FIG. 9 is a perspective view of the stinger assembly.

DETAILED DESCRIPTION OF THE PREFERRED EMBODIMENT

Referring now to the drawing, and in particular FIGS. 1-4, the apparatus of the present invention is designated generally by the numeral 10. Apparatus 10 has an elevated deck 12 with an upper surface 13 for supporting a load, for example vehicles such as passenger cars or light trucks. Deck 12 incorporates side guide rails 14, a forward stop 16 and an angled end plate 18 to aid in the loading and operation of deck 12.

Normally, deck 12 is in the lowered or down position, but during the loading and unloading phases, deck 12 is slid rearward via central underdeck hydraulic cylinder 20. Additionally, the separate operation of side hydraulic cylinders 22 causes deck 12 to pivot about hinge 24 thereby creating a ramp as shown in FIG. 3. Should any final adjustments of cylinders 20 or 22 be required, such adjustments are then made.

The construction of wrecker truck 10 is better illustrated in FIG. 4, where a pair of I-beams 26 are shown fixedly secured to the underside of deck 12. These I-beams 26 not only support and brace deck 12 and prevent any sideways movement, they also enable deck 12 to slide forward and backward. This is accomplished by having each wide-flanged I-beam 26 (or, an H-beam, as viewed laterally) slide between and along opposite pairs of spaced rails 28. As can be seen in the cross-section of FIG. 4A, the gap between the individual adjacent rails 28 defines an elongated vertical channel 23 which is slightly greater than the thickness of the elongated vertical web 25 of I-beam 26 so that the web 25 is slidable along the vertical channel 23. Additionally, the height of the adjacent rails 28 are such that they will fit between the top and bottom flanges 27A and 27B, respectively, of I-beam 26. In this fashion, each I-beam 26 can slide between the vertical surfaces of rails 28 and along the horizontal bearing surfaces of rails 28 as needed while also being restrained and supported by rails 28. Furthermore, by incorporating two pair of rails 28, any sideways movement of deck 12 is effectively prevented. Due to the large loads involved, as shown in FIG. 4A it is oftentimes practical to insert a thin wear plate 29 along the top of rails 28 to prevent any premature wear thereto.

Rails 28 themselves are secured to the underlying framework 30 of truck 10 via a subframe which includes transverse members 34. Some of the transverse members 34 include upstanding braces 35 which are fastened to and support the rail pairs 28 (see FIG. 4A). As shown in FIG. 4, central underdeck hydraulic cylinder 20 is secured at end 36 to one such transverse member 34 while the other end, end 38, is connected to the underside of deck 12. Consequently, the operation of cylinder 20 (its hydraulic reservoir and connecting lines not being shown) forces deck 12 and hence I-beam 26 to slide along and within rails 28.

Each side hydraulic cylinder 22, which are illustrated in FIGS. 1–4, have one end pivotally connected to lateral member 32 of framework 30 via hinged connection 40. The opposite end of each hydraulic cylinder 20 is also pivotally connected, but this time to forward end 42 of its respective pair of rails 28. As illustrated, as side hydraulic cylinders 20 are operated (which are operated only in unison with each other, never independently), forward end 42 of rails 28 are pivoted upward (FIG. 3) about hinge 24 until the proper loading or unloading ramp angle is achieved.

As stated earlier, prior to the operation of side hydraulic cylinder 22, deck 12 has been moved rearward by central hydraulic cylinder 20. This is necessary in order to disengage deck 12 from flange locks 44, thereby permitting the deck to be pivoted upward. Flange locks 44, which are illustrated in FIGS. 5 and 6, are secured to framework 30 just behind cab 46. As shown, as deck 12 is moved forward, the lower flange 27B of each of the dual I-beams 26 slide within a corresponding flange lock 44 where the I-beams 26 is securely held in place. Flange locks 44 comprise upper and lower spaced plates 48 and 50 that are angled to aid in the capture of I-beams 26. Once within flange locks 44, I-beams 26, and hence deck 12, are prevented from any further sideways shifting or movement as well as being prevented from accidentally pivoting upward.

Referring now to FIGS. 7 and 8, there is shown a spring lowering plate 52 secured to framework 30 just in front of tires 54. As shown, one end of spring lowering plate 52 is hinged to beam 56 via pin 58 while the other end is connected to spring 60. In this fashion, beam 56 and hence framework 30 may be lowered or moved closer to axle 62 by pivoting spring lowering plate 52 upward and locking it in position via locking pin 64. Obviously, then, both roller 66 and hinge 24 act as fulcrums for deck 12. This permits a loading angle of about 7-11 degrees and an unloading angle of about 11-20 degrees.

Referring now to FIG. 9, there is shown stinger 68 secured to framework 30 of truck 10. As shown, the end of stinger 68 moves as support 70 retracts within/extends from guides 72. While support 70 is moved horizontally by conventional hydraulic means, guide 72 can be moved vertically by similar means to eventually raise the end of stinger 68 well above the pavement.

Support 70 is pivotally connected at pivot 73 to separate cross bars 74 which can be pivoted to extend along opposite sides of support 70 as shown by ARROWS 76. The opposite end of each cross bar 74 contains an oversized sliding member 78 which can be locked in place as needed to adjust the width of cross bar 74 (see ARROWS 80). Each end of sliding member 78 is pivotally connected to tire support 82 that engages tire 84 and prevents it from turning. ARROW 86 indicates how tire support 82 can pivot with respect to sliding members 78 with tire support 82 also being able to be locked in place as needed. Extending out the end of tire support 82 is adjustable tire brace 88 which, for storage purposes, can be removed from tire support 82. Tire brace 88 fits behind tire 84 and closes the gap between tire brace 88 and tire stop 90. Tire stop 90 also engages tire 84 and between tire stop 90 and tire brace 88, tire 84 is lifted vertically upon the upward movement of guide 72. ARROW 92 illustrates how tire stop 90 can be pivoted onto sliding member 78 so that stinger 68 can be compactly folded and stored underneath truck 10. Obviously, all pivoting parts are lockable in place to prevent their movement during use. (Stinger 68 when folded-up can be used as a tow bar with chains to carry an auto that has been wrecked or has no wheels or suspension on one end).

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A wheeled vehicle having a sliding deck for receiving and carrying a load such as another vehicle, comprising:
   a vehicle frame;
   a pair of spaced rails supported by the frame, the rails defining an elongated vertical channel;
   a deck having an upper load support surface and a beam fixed to the underside of the deck, the beam having an elongated vertical web slidably fitted in the vertical channel; and wherein
   the beam includes spaced upper and lower flanges, the vertical dimension of each rail being such as to extend adjacent to and in sliding engagement with both the upper and lower beam flanges.

2. The wheeled vehicle recited in claim 1 further comprising a wear plate between an upper surface of each rail and the upper flange of the beam.

3. The wheeled vehicle recited in claim 1 further comprising means for sliding the beam relative to the rails and pivotably tilting the sub-frame and deck relative to the vehicle frame.

4. The wheeled vehicle recited in claim 1 further comprising means for releasably locking at least one of the beam flanges, to restrain a sliding movement of the beam along the corresponding rail.

5. The wheeled vehicle recited in claim 4 wherein the releasable locking means comprises a pair of spaced plates supported at one end of the sub-frame, the spaced plates aligned with the lower flange of the beam to engage the lower flange as the beam moves toward the one end.

6. The wheeled vehicle recited in claim 1 wherein the sub-frame comprises transverse members having spaced upstanding braces, and wherein the rails are fixed to the upstanding braces.

7. The wheeled vehicle recited in claim 1 further comprising means for lowering the sub-frame toward the ground.

8. A wheeled vehicle having a sliding deck for receiving and carrying a load such as another vehicle, comprising:
   a frame;
   two spaced pairs of rails, each pair of rails supported upon the frame and with each rail extending parallel with all of the other rails, each pair of rails defining an elongated vertical channel;
   a deck having an upper load support surface and a pair of spaced I-beams fixed to an underside of the deck, each I-beam having an elongated vertical web slidably fitted in the vertical channel of a corresponding rail pair; and wherein
   each I-beam includes spaced upper and lower flanges, each rail having a vertical dimension such as to extend adjacent to and in sliding engagement with both the upper and lower I-beam flanges.

9. The wheeled vehicle recited in claim 8 further comprising a low friction state between each rail and the adjacent upper flange of the corresponding I-beam.

10. The wheeled vehicle recited in claim 8 further comprising:
    an axle supporting the frame;
    an elongated spring supported at an intermediate point by the axle, the spring having first and second ends;
    a movable spring lowering plate supported by the frame at a point spaced from the axle and attached to the first end of the spring;
    a lowering beam removably attached at one end to the spring lowering plate, the lowering beam extending over the axle and attached with the second end of the spring; and wherein
    movement of the spring lowering plate relative to the axle effectuates a raising or lowering of the second end of the spring thereby permitting a loading angle reduction when the deck is angularly displaced with respect to the axle for loading.

11. The wheeled vehicle recited in claim 8 further comprising a stinger supported by the frame for engaging a vehicle to be towed.

12. The wheeled vehicle recited in claim 11 wherein the stinger comprises:
    a movable elongated support;
    a cross-bar extending lateral to and pivotably attached with the support;
    two sliding end members, each telescoping with an outer end of the cross-bar to permit a lateral adjustment of the cross-bar;
    two tire supports, each extending laterally from, and pivotably attached with a corresponding one of the sliding end members, each tire support rotatable between a storage position parallel with the cross-bar and an operational position lateral to the cross-bar; and
    two tire braces, each telescoping with a corresponding one of the tire supports.

13. A wheeled vehicle having a sliding and tilting deck for receiving and carrying a load such as another vehicle, comprising:
    a wheeled vehicle cab;
    a pair of rear wheels spaced from the cab and a rear axle supported by the rear wheels;
    a frame supported by the axle and extending rearwardly from the cab;
    a sub-frame supported by the frame;
    means for tilting the sub-frame relative to the frame in a rearward direction with respect to the cab;
    a pair of elongated spaced rails fixed to and extending along the sub-frame in a direction generally transverse to the rear axle, each rail having a generally horizontal bearing surface and a vertical surface;
    a deck having an upper load support surface;
    beam means including a beam fixed under the deck for sliding engagement with both of the rails, the beam including a generally horizontal flange supported in low friction contact upon the horizontal bearing surfaces of both rails, the beam further including a generally vertical web extending in sliding relationship with the vertical surface of both rails;
    elongated springs supported at a respective intermediate point by the rear axle, each spring having first and second ends;
    a pair of movable spring lowering plates supported by the frame at each rear wheel at a point spaced from the axle, and attached to one end of the corresponding spring;
    a pair of lowering members, each removably attached at one end to a corresponding spring lowering plate and extending over the axle and attached with the second end of the corresponding spring; and wherein
    movement of the spring lowering plates relative to the rear axle effectuates a raising or lowering of the second end of the springs, thereby permitting a loading angle reduction when the deck is angularly displaced with respect to the rear axle.

14. The wheeled vehicle recited in claim 13 wherein the rail means comprises two spaced pairs of rails, each pair of rails supported upon the sub-frame and with each rail extending parallel with all of the other rails, each pair of rails defining an elongated vertical channel and with each rail having a generally horizontal bearing surface and a corresponding vertical surface.

15. The wheeled vehicle recited in claim 14 wherein the beam means comprises a pair of spaced beams, each of which includes a generally horizontal flange in low friction contact with the horizontal bearing surface of both rails in one pair of the rails, each beam also including a vertical web extending in sliding engagement with the vertical channel of the corresponding pair of rails.

* * * * *